Feb. 29, 1944.  D. R. MATTOON  2,343,017
TEAPOT ASSEMBLY
Filed Aug. 18, 1941
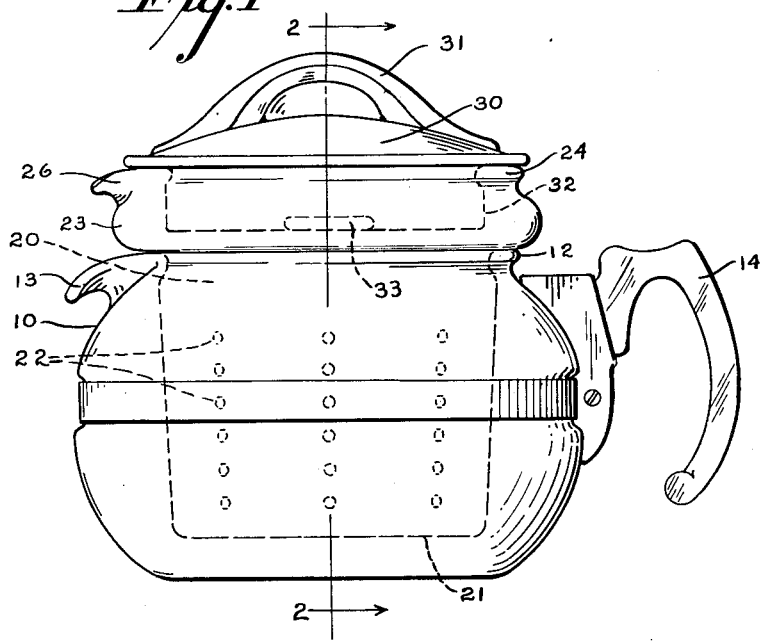
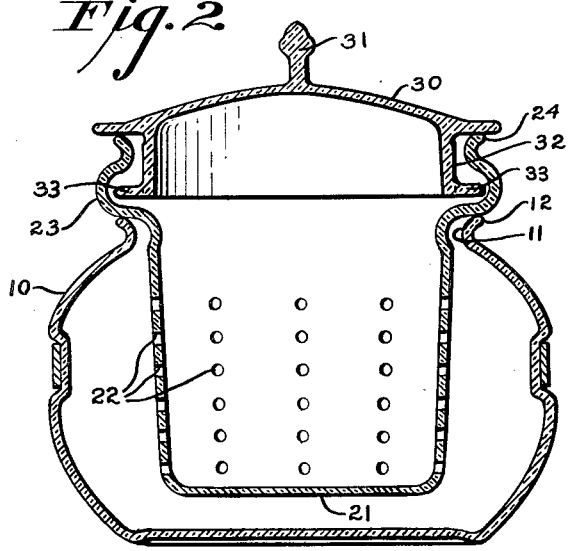
Inventor
DEO R. MATTOON
By
F. H. Knight.
Attorney Patented Feb. 29, 1944

2,343,017

UNITED STATES PATENT OFFICE 2,343,017

TEAPOT ASSEMBLY

Deo R. Mattoon, Corning, N. Y., assignor to Corning Glass Works, Corning, N. Y., a corporation of New York Application August 18, 1941, Serial No. 407,369

3 Claims. (Cl. 99—322)

The present invention relates to culinary vessel assemblies suitable for use in brewing tea or the like and for food steaming purposes.

In the brewing of most concoctions it is desirable to prevent the agitation of the fluid surrounding the ingredients from which the brew is being prepared. For example, clearer tea can be brewed if the tea leaves are maintained in a quiescent state. It is also advantageous in the brewing operation as well as in the steaming of food to be able by casual observation to determine the progress of the operation being performed.

One object of the present invention is a culinary vessel assembly suitable for brewing tea or the like designed to function in such a manner as to hold the ingredients of the brew in a quiescent state.

Another object is a culinary vessel assembly suitable for steaming foods.

In the accompanying drawing, by way of illustration, the invention is embodied in an assembly of the shape preferred when the same is to be employed for brewing concoctions, although the structure illustrated is also suitable for steaming food.

In the drawing:

Fig. 1 is a side elevation of the assembly; and

Fig. 2 is a sectional elevation of the same on line 2—2 of Fig. 1.

The assembly comprises a container 10, a basket 20, and a cover 30. The container 10 has a somewhat restricted top opening 11 bounded by a rim 12 having a pouring lip 13 formed in the rim. A handle 14 is provided on the side of the container 11 opposite the pouring lip 13.

The cover 30 has a handle 31 and a depending flange 32 adapted to fit into opening 11. The flange 32, however, has laterally extending nibs 33 formed therein having a greater transverse dimension than the diameter of opening 11. The cover 30 may, nevertheless, be placed over the opening 11 and brought to rest on the rim 12 by projecting one of the nibs 33 under the rim 12 at a point opposite the pouring lip 13 thereby bringing the remaining nib 33 into register with the pouring channel of lip 13 so that the latter nib can also be lowered below the level of rim 12. By then turning the cover 30, the nib 33 which has been lowered into the channel of the pouring lip 13, is also brought under rim 12, thereby locking the cover in place.

The basket 20 has a circular bottom 21 which is impervious and which is bounded by a sidewall having perforations 22. The basket 20 has a bulged top portion 23 terminating in a rim 24 bounding a constricted top opening and having a lip 26 formed in the rim thereof. The external diameter of basket 20 below its bulged portion 23 is such that it may be readily lowered into the top opening 11 of container 10 and brought to rest suspended by its bulged portion 23 on the rim 12. The rim 24 of basket 20 is of substantially the same size and shape as the corresponding part of container 10. Also, the interior cross section of the adjoining bulged portion 23 is similar in size and shape to the space immediately below the rim 12 of container 10 so that the cover 30 can be locked to the basket 20 in the same fashion as when used as a cover for container 10.

In use of the assembly in brewing tea or the like, the container 10 is partly filled with water and the water heated to a desired temperature. Either before or after heating of the water, the dry ingredients are placed over the bottom area of basket 20, the cover 30 placed thereon in locking relation thereto, and the basket lowered by means of the cover handle 31 into container 10. When this method of procedure is followed, the cover affords protection to the user against hot vapors which rise from the basket as it enters the hot water. As the basket 20 is lowered into the container, the water therein rises about the basket sidewall, passes through perforations 22 and pours down onto the ingredients from all around thus holding them in a quiescent state. Also, subsequent circulation resulting from the temperature gradient of the fluid continues to maintain the ingredients in their initial position after the basket has been seated. When the brew has been completed the basket 20 may conveniently be withdrawn therefrom by means of the handle 31 of cover 30 and deposited to one side. Due to the absence of perforations in the bottom 21, dripping of liquid therefrom is reduced to a minimum during transfer. As the basket is deposited, the cover 30 may be freed therefrom and immediately employed to cover the container 10.

The assembly may be used as a steamer in much the same manner as when used for brewing. When, however, food is to be steamed the water level in container 10 should at all times be below the level of the bottom of basket 20.

While in the foregoing there has been shown and described the preferred embodiment of the invention, it is to be understood that minor changes in the details and proportions thereof as would be desirable for primary use as a food steamer may be made without departing from the spirit and scope of the invention as claimed.

I claim:

1. A culinary vessel assembly comprising two containers having top openings of substantially the same size, one of said containers being adapted to fit in part within the other and having a bulge in its upper side wall adapted to engage with and support said container from the rim of the other container, a cover adapted to rest on the rim of either container having a depending flange adapted to fit in the opening of either container, and transversely extending nibs formed on the depending flange having a greater transverse dimension than the diameter of the openings in said containers, each container having a lip formed in the rim bounding the top opening thereof through which one of said nibs is passed as the other nib is projected under the rim of the opening in the placement of the cover thereon.

2. In an infusion apparatus a container having a lipped top opening, a second container having a lipped top opening and adapted for arrangement in part within the first container, said second container having an impervious bottom, but having a pervious side wall for the passage of fluids between the interior of said containers, a handle for the first container, a cover of greater cross section than the top openings of the containers adapted to rest on the rim of the top opening of either container, a flange depending from said cover for introduction into such openings having laterally projecting nibs of a greater transverse dimension than such openings, the lip in the rim of each container opening affording a passage for one of the nibs in their orientation within a container opening, said nibs serving when both are arranged under rim portions of the second container to enable the cover to serve as a handle for withdrawing the second container from association with the first container and serving to hold the cover on the first container when tilted to pour fluids therefrom.

3. An infusion device comprising a hollow container having a handle and having a pouring lip formed in its rim as a part of the container opening, a hollow container adapted to fit in the opening of said first container and having a bulge in its upper side walls adapted to engage with and support said container from the rim of said first container, said second container having a top opening of substantially the same size as that of said first container with a lip also formed in its rim, and a cover having a depending flange adapted to fit in the openings of both said containers and having transversely extending nibs formed thereon having a greater transverse dimension than the diameter of the openings in said containers, whereby placement of the flange of the cover into the opening of either container requires passage of one of the nibs through the clearance provided for it by the lip.

DEO R. MATTOON.